UNITED STATES PATENT OFFICE 2,491,851

SYNTHETIC RESIN AND PROCESS FOR MAKING IT

Pio Caccia, Cincinnati, Ohio, assignor of one-fourth to Michael Di Girolamo, Cincinnati, Ohio No Drawing. Application March 17, 1945,
Serial No. 583,383

5 Claims. (Cl. 260—283)

The present invention relates to synthetic resins and is particularly directed to a process for preparing new synthetic resins by reacting an unsaturated fatty oil with sulfur and an heterocyclic compound having a tertiary nitrogen in its ring.

In a specific sense an object of this invention is to provide a new synthetic resin which is manufactured when an unsaturated fatty oil chemically reacts with sulfur and a member of the class pyridine or said oil chemically reacts with sulfur and a member of the class of quinoline.

Factices, as are now manufactured, are the reaction product of an unsaturated fatty oil with sulfur according the following chemical structure:

```
···CH₂—CH  S  CH—CH₂···
···CH₂—CH  S  CH—CH₂···
```

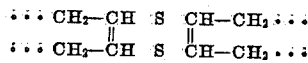

The synthetic resins manufactured according to my new process contain a heterocyclic compound with a tertiary N in its ring, such as pyridine or quinoline, said compound being bound to sulfur to make polysulphide structures. The following structural formulas illustrate the composition of my new resin when one or two moles of pyridine are bound to sulfur.

One mole of pyridine

C₅H₅N

```
···CH₂—CH  S  S  CH—CH₂···
···CH₂—CH  S  S  CH—CH₂···
``` or

Two moles of pyridine

C₅H₅N

```
···CH₂—CH  S  S  CH—CH₂···
···CH₂—CH  S  S  CH—CH₂···
```

C₅H₅N and obtaining with one mole of pyridine:

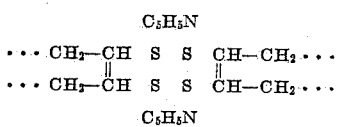

or with two moles of pyridine:

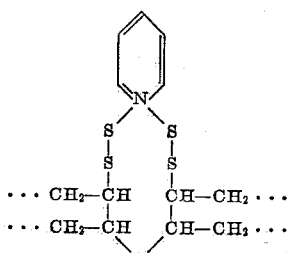

Quinoline,

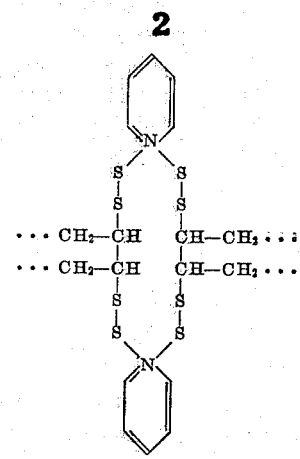

which has also a tertiary nitrogen in the ring, can be substituted in the above formulas in the place of pyridine because disulphide is bound to the open ethylenic bond as in factices and also with nitrogen. The final product acts not only as an extender in rubber mixes, but also as an accelerator at the same time. The final product is far different from factices and one of the marked differences is the way these new resins act when melted. Factices, when melted and then cooled, stay fluid as do sulphurised oils, whereas my new resins, when melted, become solid again on cooling.

I have found that it is very hard to put these new synthetic resins into solution. The fact that the smell of pyridine disappears from the final product shows clearly that pyridine is gone into a chemical combination. Also on treating the final resin with acid, these acids are not fixed by pyridine which shows that pyridine is bounded through the tertiary nitrogen. On boiling the resins with caustic, no ammonia is degaged, which also shows that the ring of pyridine had not been broken, otherwise the amino compound would have given up ammonia. In the present invention no water is used during the reaction and elemental sulfur is used instead of sulfur dichloride. Pyridine being a base combines with acids to make salts and the water solution fixes the hydrogen chloride acid in the manufacture of white factices. Also amino compounds are used for this same purpose to fix the acid.

In the manufacture of my new synthetic resins the amounts are molecular and when one mole of pyridine is bound to oil and sulfur, the following amounts of these substances, expressed in percentages, are used:

71.1% unsaturated fatty oil as trioleate
19.4% elemental sulfur
9.5% pyridine

If on the other hand two moles of pyridine are reacting the proportions in percentage are:

58.8% fatty oil as glycerol trioleate
25.4% sulfur
15.8% pyridine

The percentages given above change according to the length of the chain of the fatty acids of the unsaturated fatty oils. In the example given, the glycerol trioleate, having the formula

has a molecular weight of 885.41. When the reaction with pyridine and sulfur takes place, two moles of glycerol trioleate are reacting with 6 moles of pyridine, and 12 disulfide groups according to the following chemical structure:

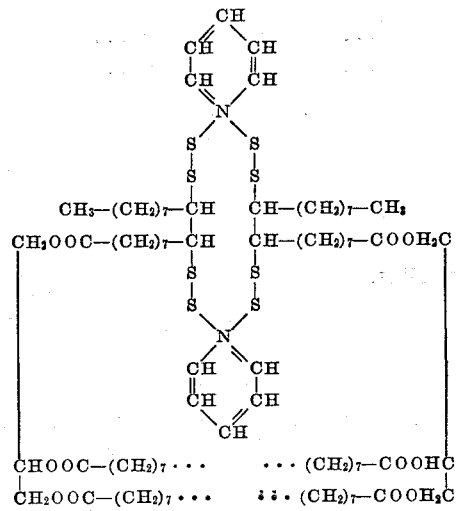

The example above given shows that for two moles of glycerol trioleate 1770.82 parts of glycerol trioleate are needed, 768 parts of sulfur, and parts 474 of pyridine, when two moles of pyridine are taking part in the reaction. In percentages the proportions are: glycerol trioleate 58.8%, sulfur 25.4%, pyridine 15.8%.

If, on the other hand, one mole of pyridine is taking place in the reaction, then the percentages are: glycerol trioleate 71.1%, sulfur 19.4%, pyridine 9.5%.

It is my belief that during the reaction sulfur becomes —SH, which on oxidation gives the disulfide —SS—. In the gas that evolves during the reaction, mercaptans are found, whose presence could confirm my belief. The pyridine ring is kept intact, while the nitrogen becomes pentavalent.

The specific steps, the constituents and the proportions for making my new synthetic resins from olive oil will now be described briefly so that my process and product will be clearly understood by those skilled in the art. The steps comprise the reaction of an unsaturated fatty oil such as soy bean oil, or in the present instance, olive oil together with elemental sulfur and an heterocyclic compound having tertiary nitrogen in its ring, such as a member of the class of pyridine and quinoline, which are all heated together to about 180° C. The resin produced with olive oil is obtained by mixing together about 58.8 parts by weight of olive oil, 25.4 parts of powdered sulfur, and 15.8 parts of pyridine, which are gradually warmed under reflux. When the temperature of the reacting mass reaches 170° C., the mixture becomes light orange in color. At 182° C. the reaction becomes exothermic. Heating is discontinued; but the whole mass spontaneously boils up, and a large volume of gas is generated. Mercaptans and hydrogen sulphide are present among the gaseous products. Mixing is continued during this stage of the reaction, and the condensible vapors in the gaseous products are refluxed back into the reacting mass. During the reaction about 8% of the reactant mass is lost in the form of gaseous material not condensible in the reflux condenser. When the reaction subsides, the warm, soft mass remaining in the aparatus is removed and extracted with carbon tetrachloride. There is thus obtained a quantity of viscous oil corresponding to about 7% of the total weight of the original reactants. The extracted residue is a brown, slightly elastic resinous product soft enough to be cut with a knife. This residue, which is obtained in 85% yield, is the final product sought, one of my new synthetic resins. It begins to soften at about 178° C., and melts completely at 128° C. It is insoluble in the ordinary organic solvents, such as petroleum ether, alcohol, chloroform, carbon tetrachloride, etc. It is tough, flexible, semi-elastic, and has a rubber-like appearance. It retains its physical and chemical properties over long periods of time, even when exposed to the air at somewhat elevated temperatures. These properties, together with its ready fusibility at a definite temperature, indicate that it is a cross-linked polymer.

In the production of the other synthetic resin, 23.2 pounds of powdered sulphur is thoroughly mixed into 53.4 pounds of olive oil, and 23.4 pounds of quinoline is mixed therewith. The mixture is placed under reflux and heated at such a rate that it attains a temperature of 182° C. in about half an hour. At about 182° C. a vigorous exothermic reaction is initiated, and external heating is immediately discontinued. The exothermic reaction proceeds by itself for about 10 minutes, during which the temperature of the reacting mass rises to about 225° C. After the reaction subsides, the mixture produced thereby, comprising the new synthetic resin and viscous oil, is ready for use. This mixture is substantially the same as that obtained in the example given above. The properties of the extracted synthetic resin are likewise substantially the same as those characterizing the resin produced under the first example above.

In the production of synthetic resins by my process with other unsaturated fatty oils the proportions and percentages of ingredients change according to the length of the chain of the fatty acid going into the reaction because of the higher or lower molecular weight of the particular oil used.

The resin described herein has the same properties and chemical constitution as the resin made from soy bean oil and has the same applications of usefulness which are briefly, an extender and accelerator in the manufacture of rubber, it may be vulcanized with zinc oxide to form a coating impervious to turpentine, it may be used as a constituent in varnish, laquer and paints, and it may also be used as a substitute for rubber in cements, or the like.

What is claimed is:

1. The process of making a synthetic resin which comprises reacting together two mols of unsaturated fatty oil, twenty-four mols of elemental sulfur, and six mols of a member selected from the class consisting of quinoline and pyridine, by heating, under reflux, said reactants to a temperature of 180° C., to initiate an exothermic reaction, and thereafter permitting said exothermic reaction to proceed without external heating.

2. The process of making a synthetic resin which comprises reacting together by heating under reflux to 180° C. two mols of an unsaturated fatty oil, twenty-four mols of elemental sulfur, and six mols of a member selected from the class consisting of pyridine and quinoline.

3. The process of making a synthetic resin which comprises reacting together by heating under reflux to a temperature of 180° C., a mixture comprising 53.4 per cent unsaturated fatty oil, 23.2 per cent elemental sulfur, and 23.4 per cent quinoline.

4. The process of making a synthetic resin which comprises reacting together by heating to a temperature of 180° C. a mixture comprising 58.8 per cent unsaturated fatty oil, 25.4 per cent elemental sulfur, and 15.8 per cent pyridine.

5. A synthetic resin melting at 182° C. and comprising the polymerized reaction product obtained by heating under reflux to 180° C. two mols of an unsaturated fatty oil, twenty-four mols of elemental sulfur, and six mols of a member selected from the class consisting of pyridine and quinoline.

PIO CACCIA.

REFERENCES CITED

The following references are of record in the file of this patent:

UNITED STATES PATENTS

| Number | Name | Date |
|---|---|---|
| 1,159,258 | Nuth | Nov. 2, 1915 |
| 1,669,491 | Savage | May 15, 1928 |
| 2,137,584 | Ott | Nov. 22, 1938 |
| 2,152,185 | Gottesman | Mar. 28, 1939 |
| 2,166,661 | Hopkins | July 18, 1939 |
| 2,257,750 | Lincoln | Oct. 7, 1941 |
| 2,384,491 | Posnansky | Sept. 11, 1945 |